US012752297B2

(12) United States Patent
Scraggs et al.

(10) Patent No.: US 12,752,297 B2
(45) Date of Patent: Oct. 6, 2026

(54) DEPOSITION OF SEALANT OR SIMILAR MATERIALS

(71) Applicant: THE UNIVERSITY OF SHEFFIELD, Sheffield (GB)

(72) Inventors: Chris Scraggs, Bristol (GB); George Sleath, Bristol (GB)

(73) Assignee: THE UNIVERSITY OF SHEFFIELD, Sheffield (GB)

( * ) Notice: Subject to any disclaimer, the term of this patent is extended or adjusted under 35 U.S.C. 154(b) by 0 days.

(21) Appl. No.: 18/514,787

(22) Filed: Nov. 20, 2023

(65) Prior Publication Data

US 2024/0207884 A1 Jun. 27, 2024

(30) Foreign Application Priority Data

Dec. 21, 2022 (GB) ...................................... 2219436

(51) Int. Cl.

*B05C 5/02* (2006.01)
*B05D 1/26* (2006.01)
*B05D 1/40* (2006.01)

(52) U.S. Cl.

CPC .............. *B05C 5/0254* (2013.01); *B05D 1/26* (2013.01); *B05D 1/40* (2013.01)

(58) Field of Classification Search

None

See application file for complete search history.

(56) References Cited

U.S. PATENT DOCUMENTS 5,670,182 A 9/1997 Mower
5,695,788 A * 12/1997 Woods .................... E04F 21/08 15/245.1
5,769,947 A 6/1998 Krappweis
5,770,129 A 6/1998 Monti
5,853,482 A 12/1998 Gartmann et al.
6,565,660 B1 5/2003 Wagner et al.
10,315,215 B2 6/2019 Higgins et al.
(Continued)

FOREIGN PATENT DOCUMENTS

EP 2397860 A1 * 12/2011 ....... G01N 35/00009

OTHER PUBLICATIONS

Partial European Search Report for Application No. EP 23218466, five pages, dated Oct. 4, 2024.
(Continued)

*Primary Examiner* — Michael P. Rodriguez
(74) *Attorney, Agent, or Firm* — Nixon & Vanderhye, PC

(57) ABSTRACT

An applicator for the deposition of sealant onto a surface of a workpiece is disclosed having at least one inlet for depositing sealant on to a surface or a nozzle-receiving space for receiving a nozzle comprising at least one inlet for depositing sealant on to a surface; at least one sealant-contacting surface for contacting sealant deposited onto the surface through the inlet as the applicator is moved across the surface, thereby forming a film of sealant on said surface; at least one spacer for contacting a surface onto which sealant is to be deposited and for maintaining the sealant-contacting surface in spaced relationship with the surface; and at least one inlet reservoir for receiving sealant from at least one inlet, at least one overflow outlet for the egress of excess sealant from an inlet reservoir; and an overflow reservoir for receiving excess sealant from at least one overflow outlet.

19 Claims, 3 Drawing Sheets

(56) References Cited

U.S. PATENT DOCUMENTS

| | | | |
|---|---|---|---|
| 2008/0000418 | A1 | 1/2008 | Ooshima et al. |
| 2015/0224700 | A1 | 8/2015 | Loukusa et al. |
| 2016/0296951 | A1* | 10/2016 | Higgins ............ B05C 17/00516 |
| 2017/0100740 | A1* | 4/2017 | Pentland ............. B05C 17/0123 |
| 2020/0353500 | A1 | 11/2020 | Kim et al. |
| 2023/0302488 | A1 | 9/2023 | Brookes et al. |
| 2024/0207887 | A1* | 6/2024 | Scraggs .................... B05C 9/06 |

OTHER PUBLICATIONS

European Search Report for Application No. EP 23218472, four pages, dated Oct. 7, 2024.
Search Report for GB2219429.4 dated Jul. 4, 2023, 1 page.
Search Report for GB2219436.9 dated Jun. 27, 2023, 1 page.

* cited by examiner

DEPOSITION OF SEALANT OR SIMILAR MATERIALS

CROSS RELATED APPLICATION

This application claims priority to United Kingdom Patent Application GB 2219436.9, filed Dec. 21, 2022, the entire contents of which is hereby incorporated by reference.

BACKGROUND OF THE INVENTION

The present disclosure relates to the deposition of sealant and similar materials.

The present invention concerns deposition of sealant and similar materials. More particularly, but not exclusively, this invention relates to an applicator for the deposition of sealant onto a surface of a workpiece. The invention also concerns an apparatus for the deposition of sealant onto a surface of a workpiece, and a method of depositing sealant onto a surface of a workpiece.

Traditionally, sealant has been dispensed onto a workpiece using a nozzle attached to source of sealant. An operator would draw the nozzle over the surface of the workpiece at a desired speed, forming a film of sealant from a bead that is initially deposited on the surface. The width of the deposited film would depend on the width of the nozzle, the pressure used to supply the sealant to the nozzle and the rate at which the user moves the nozzle over the surface of the workpiece. If the sealant supply pressure is too high or the user moves the nozzle too slowly, then too much sealant will be dispensed. If the pressure is too low or the user moves the nozzle too quickly, then too little sealant is dispensed and an inadequate film is formed. The width of the film also depends on the force exerted between the nozzle and the surface of the workpiece, a higher force providing a wider and thinner film. Therefore, the application of a satisfactory film of sealant can be difficult using a conventional technique. Furthermore, it can be difficult to reproduce films using conventional techniques.

The present invention seeks to mitigate the above-mentioned problems. Alternatively or additionally, the present invention seeks to provide improved deposition of sealant onto a surface of a workpiece.

SUMMARY OF THE INVENTION

In accordance with a first aspect of the present invention, there is provided an applicator for the deposition of sealant onto a surface of a workpiece, the applicator comprising:

at least one inlet for depositing sealant on to a surface or a nozzle-receiving space for receiving a nozzle comprising at least one inlet for depositing sealant on to a surface;

at least one sealant-contacting surface for contacting sealant deposited onto the surface through an inlet as the applicator is moved across said surface, thereby forming a film of sealant on said surface;

at least one spacer for contacting a surface onto which sealant is to be deposited and for maintaining the sealant-contacting surface in spaced relationship with the surface; and at least one inlet reservoir for receiving sealant from at least one inlet, the inlet reservoir being configured to provide a covered space when the applicator is in contact with a surface onto which sealant is to be deposited.

The applicant has discovered that the provision of an inlet reservoir for receiving sealant that provides a covered space helps retain sealant and inhibits loss of the sealant from the applicator. Furthermore, the covering of the reservoir enables the applicator to be used in an inverted or otherwise non-upright orientation without sealant being lost from the applicator. The shape and size of an inlet reservoir may be configured so that a reasonable amount of sealant may accumulate in the inlet reservoir, which may help if a greater amount than expected of sealant is delivered to the inlet reservoir.

At least one, optionally more than one and optionally each inlet reservoir may be configured to provide a covered space when the applicator is in contact with the surface onto which sealant is to be deposited.

The applicator may comprise an applicator main body. The applicator main body may comprise one or more of: at least one inlet for depositing sealant on to a surface or a nozzle-receiving space for receiving a nozzle comprising at least one inlet for depositing sealant on to a surface; at least one sealant-contacting surface for contacting sealant deposited onto the surface through the inlet as the applicator is moved across said surface, thereby forming a film of sealant on said surface; at least one spacer for contacting a surface onto which sealant is to be deposited and for maintaining the sealant-contacting surface in spaced relationship with the surface; and at least one inlet reservoir for receiving sealant from at least one inlet, the inlet reservoir being configured to provide a covered space when the applicator is in contact with a surface onto which sealant is to be deposited.

At least one, optionally more than one and optionally each inlet reservoir has an open face for placement proximate to the surface on to which sealant is to be deposited.

The applicator may comprise more than one inlet reservoir. If there is more than one inlet reservoir, then adjacent inlet reservoirs may be separated by a partition, or similar obstruction, to inhibit movement of sealant between inlet reservoirs. For example, the applicator may comprise a first inlet reservoir and a second inlet reservoir separated by a first partition. The applicator may optionally comprise a third inlet reservoir, optionally separated from the second inlet reservoir by a second partition. The applicator may comprise a plurality of laterally-spaced inlet reservoirs. The lateral dimension (width) of the inlet reservoirs may be the same or different. The provision of more than one inlet reservoir facilitates the deposition of films of different widths using one applicator.

Optionally, the applicator may comprise more than one inlet for depositing sealant onto a surface.

Optionally, an inlet reservoir may be configured to receive sealant from more than one inlet. Optionally, an inlet reservoir may be configured to receive sealant from one, and only, one inlet.

The applicator optionally comprises at least one overflow outlet for the egress of excess sealant from an inlet reservoir, the overflow outlet being in fluid communication with an inlet reservoir. At least one, optionally more than one, and optionally each inlet reservoir may be in fluid communication with at least one such overflow outlet. The applicator optionally comprises a plurality of such overflow outlets, each overflow outlet being in fluid communication with an inlet reservoir. At least one, optionally more than one and optionally each inlet reservoir may be in fluid communication with a plurality of overflow outlets. Optionally, a plurality of overflow outlets that are in communication with an inlet reservoir may be evenly spaced. At least one, optionally more than one and optionally each overflow outlet may provide a flow constrictor in a fluid flow path out of an inlet reservoir. For example, a fluid flow path out of an inlet reservoir may comprise an overflow outlet in a fluid flow path between a conduit and the inlet reservoir, the cross-sectional area of the overflow outlet being smaller than that of the conduit. The overflow outlet therefore forms a flow constrictor. The flow constrictor inhibits unwanted leakage of sealant from the applicator, while permitting egress of sealant in the event of too high a pressure in the inlet reservoir.

At least one, optionally more than one, and optionally each overflow outlet is optionally located forward of the respective inlet reservoir. At least one, optionally more than one, and optionally each overflow outlet is optionally in communication with the respective inlet reservoir at a forward part of the inlet reservoir. For the avoidance of doubt, in this context "forward" is defined in relation to the intended direction of use of the applicator. In this connection, the inlet reservoir(s) would typically be located forward of the sealant-contacting surfaces. At least one, optionally more than one and optionally each overflow outlet may optionally be configured to be remote from a surface onto which sealant is to be deposited. In this connection, the applicator may be configured so that at least one, optionally more than one and optionally each inlet is more proximate to a surface onto which sealant is to be deposited than at least one, optionally more than one and optionally each overflow outlet.

The applicator optionally comprises at least one overflow reservoir for receiving excess sealant from at least one overflow outlet. Optionally, at least one, optionally more than one and optionally each overflow outlet is in fluid communication with an overflow reservoir. The application optionally comprises more than one such overflow reservoir.

At least one, optionally more than one and optionally each inlet reservoir is optionally in fluid communication with an overflow reservoir. Optionally, there is at least one, optionally more than one and optionally a plurality of fluid flow paths from the overflow reservoir(s) to an overflow reservoir. A flow constrictor is optionally provided in a fluid flow path between at least one inlet reservoir and an overflow reservoir. Such flow constrictors inhibit unwanted leakage of sealant from the applicator (typically at low pressures), but permit egress of sealant from an inlet reservoir if the pressure in an inlet reservoir is too high. Optionally, more than one and optionally each such fluid flow path is provided with a flow constrictor. An overflow outlet may provide a flow constrictor. In this connection, the cross-sectional area of the overflow outlet may be lower than the cross-sectional area of the fluid flow path from the overflow outlet to the overflow reservoir.

The overflow reservoir optionally retains excess sealant, and inhibits unwanted leaking of sealant from the applicator.

At least one, optionally more than one and optionally each overflow reservoir optionally comprises one or more surfaces for retaining excess sealant. For example, at least one, optionally more than one and optionally each overflow reservoir optionally comprises a trough for the receipt, and retention of, excess sealant. Such a trough is optionally elongate. Such a trough may run parallel to the width of the applicator. For example, a longitudinal axis of the trough may be normal to a longitudinal axis of the applicator (and normal to the intended direction of use of the applicator). Such a trough may optionally comprise one or more trough walls to facilitate retention of excess sealant. The trough may comprise a first wall, and a second wall portion that projects from the first wall portion, optionally substantially normal to the first wall portion. The trough may comprise a third wall portion that optionally projects from the second wall portion, optionally from an end of the second wall portion remote from the end of the second wall portion that projects from the first wall portion. The third wall portion may optionally project substantially normal to the second wall portion. The third wall portion may optionally form a lip that projects from the second wall portion. The trough may comprise at least one lateral trough wall that inhibits loss of excess sealant.

At least one, optionally more than one and optionally each overflow reservoir may be located forward of at least one, optionally more than one, and optionally each inlet reservoir. For the avoidance of doubt, in this context "forward" is defined in relation to the intended direction of use of the applicator. In this connection, the inlet reservoir(s) would typically be located forward of the sealant-contacting surfaces.

Optionally, at least one, optionally more than one and optionally each sealant-contacting surface is provided with at least one spacer for contacting a surface onto which sealant is to be deposited and for maintaining the sealant-contacting surface in spaced relationship with the surface on which sealant is to be deposited. Optionally, more than one sealant-contacting surface is provided with at least one such spacer. Optionally, at least one sealant-contacting surface is substantially devoid of such spacers. Optionally, a rearmost sealant-contacting surface is substantially devoid of such spacers. Such an arrangement facilitates the smoothing out of any furrows that such spacers produce in a film.

At least one, optionally more than one and optionally each spacer may be in the form of an optionally squat projection. At least one, optionally more than one and optionally each projection may project from a sealant-contacting surface. At least one, optionally more than one and optionally each projection may be hemispherical, a segment of a sphere, conical, frusto-conical, cylindrical or cuboid. The applicator may comprise a plurality of squat projections that project from a respective sealant-contacting surface for maintaining the sealant-contacting surface in spaced relationship with the surface.

In accordance with a second aspect of the present invention, there is provided an applicator for the deposition of sealant onto a surface of a workpiece, the applicator comprising:

- at least one inlet for depositing sealant on to a surface or a nozzle-receiving space for receiving a nozzle comprising at least one inlet for depositing sealant on to a surface;
- at least one sealant-contacting surface for contacting sealant deposited onto the surface through the inlet as the applicator is moved across said surface, thereby producing a film of sealant on said surface; and
- a plurality of squat projections that project from a respective sealant-contacting surface for maintaining the sealant-contacting surface in spaced relationship with the surface.

At least one, optionally more than one and optionally each projection may optionally be hemispherical, a segment of a sphere, conical, frusto-conical, cylindrical or cuboid.

At least one, optionally more than one and optionally each sealant-contacting surface may comprise a flat portion. At least one, optionally more than one and optionally each flat portion may be provided with a plurality of squat projections.

The applicator may comprise a first set of projections extending from a first sealant-contacting surface and a second set of projections extending from a second sealant-contacting surface. The first and second sealant-contacting surfaces may be spaced along a length of the applicator.

The applicator may comprise an applicator main body. The applicator main body may comprise one or more of: at least one inlet for depositing sealant on to a surface or a nozzle-receiving space for receiving a nozzle comprising at least one inlet for depositing sealant on to a surface; at least one sealant-contacting surface for contacting sealant deposited onto the surface through the inlet as the applicator is moved across said surface, thereby producing a film of sealant on said surface; and a plurality of squat projections that project from a respective sealant-contacting surface for maintaining the sealant-contacting surface in spaced relationship with the surface.

The first set of projections may be substantially evenly spaced. The second set of projections may be substantially evenly spaced.

Optionally, at least one sealant-contacting surface (optionally including the rearmost sealant-contacting surface) may be substantially devoid of projections. While the projections maintain the sealant-contacting surface(s) in spaced relationship with the surface on which the sealant is deposited, they also cause the formation of furrows in the bead of sealant. The provision of a trailing sealant-contacting surface without projections facilitates the smoothing out of those furrows.

The applicator of the second aspect of the present invention may comprise at least one inlet reservoir for receiving sealant from at least one inlet.

The applicator of the second aspect of the present invention may comprise any of the features of the applicator of the first aspect of the present invention. Similarly, the applicator of the first aspect of the present invention may comprise any of the features of the application of the second aspect of the present invention.

For the avoidance of doubt, the statements below relate to the applicators of the first and second aspects of the present invention, unless context dictates otherwise.

At least one, optionally more than one and optionally each sealant-contacting surface extends across a width of the applicator. Optionally, multiple sealant-contacting surfaces are mutually spaced along a length of the applicator. A length of the applicator may be determined along a longitudinal direction of the applicator, as determined by the intended direction of movement of the applicator. A space for the collection of sealant may be provided between adjacent sealant-contacting surfaces. Such spaces may facilitate the collection of sealant, which may be advantageous if excessive amounts of sealant are being provided to the applicator. Such a space may be substantially parallel to the sealant-contacting surfaces, and optionally have a longitudinal axis normal to the length of the applicator. Such a space may be provided with one or more dividers to inhibit lateral movement of sealant within said space, the dividers forming a plurality of sub-spaces. The lateral position of a sub-space may correspond to a lateral position of an inlet reservoir immediately in front of the sub-space. In this manner, the width of a film deposited by introducing sealant into a particular selection of inlet reservoirs can be controlled.

An applicator may, for example, comprise first and second inlet reservoirs configured to receive sealant from first and second inlets, respectively. First and second inlet reservoirs may be of different widths, a first inlet reservoir width and a second inlet reservoir width, respectively. The applicator may comprise first and second sealant-contacting surfaces spaced along the length of the applicator. A first space for the receipt of sealant is optionally formed between the first and second sealant-contacting surfaces. A divider may be provided, thereby separating the space into a first sub-space and a second sub-space. The width of the first sub-space is optionally the same as the first inlet reservoir width and the width of the second sub-space is optionally the same as the second inlet reservoir width. The lateral location of the first sub-space is optionally substantially the same as the lateral location of the first inlet reservoir. The lateral location of the second sub-space is optionally substantially the same as the lateral location of the second inlet reservoir.

The applicator may comprise a third sealant-contacting surface spaced along the length of the applicator from, and to the rear of, the second sealant-contacting surface. A second space for the receipt of sealant is optionally provided between the second sealant-contacting surface and the third sealant-contacting surface. A divider may be provided, thereby separating the second space into a third sub-space and a fourth sub-space. The width of the third sub-space is optionally the same as the first inlet reservoir width and the width of the fourth sub-space is optionally the same as the second inlet reservoir width. The lateral location of the third sub-space is optionally substantially the same as the lateral location of the first inlet reservoir. The lateral location of the fourth sub-space is optionally substantially the same as the lateral location of the second inlet reservoir.

At least one, optionally more than one and optionally each sealant-contacting surface may comprise a flat portion. At least one, optionally more than one and optionally each flat portions may be provided with one or more spacers (for example, squat projections) that extend away from said flat portion. Optionally, at least one flat portion, and optionally the rearmost flat portion, may be substantially devoid of spacers.

At least one, optionally more than one and optionally each sealant-contacting surface may be provided by a baffle. At least one, optionally more than one and optionally each baffle may comprise a curved surface. At least one, optionally more than one and optionally each baffle may comprise a flat surface, optionally configured to be adjacent to a surface on which sealant is to be deposited. At least one, optionally more than one and optionally each flat surface may be provided with one or more spacers that extend away from said flat surface.

The applicator may comprise one or more lateral walls to inhibit egress of sealant from the applicator. The applicator may comprise one or more lateral walls to inhibit egress of sealant from one or more inlet reservoirs.

The applicator may comprise at least one, and optionally more than one, nozzle for depositing sealant. At least one, optionally more than one and optionally each nozzle is typically configured to receive sealant from a source of sealant. At least one, optionally more than one and optionally each nozzle may comprise an inlet for depositing sealant on a surface, or may be configured to deliver sealant to one or more inlets. One nozzle may provide at least one, optionally more than one and optionally each inlet. Alternatively, the applicator may comprise a plurality of nozzles, each of which is configured to deliver sealant to one (and only one) inlet.

The applicators of the first and second aspects of the present invention are optionally suitable for forming a film of sealant on a surface of a workpiece. The workpiece may optionally be a vehicle component, such as an aircraft component. The applicators of the first and second aspects of the present invention are optionally suitable for sealing a gap between two different workpieces.

According to a third aspect of the invention, there is also provided an apparatus for forming a film of sealant on a surface of a workpiece, the apparatus comprising an applicator in accordance with the first or second aspect of the present invention and a source of sealant configured to deliver sealant to the applicator.

The sealant may comprise non-metallic material. The sealant may workable at room temperature. The sealant may comprise or be a curable material. The sealant may be curable to a final state, such that the sealant is flexible in the final state.

The apparatus may be configured to facilitate formation of a film on a downwardly-facing surface. In this connection, the apparatus may be configured to contact sealant with a surface of the workpiece when the surface with which the sealant is to be contacted is above the applicator (i.e. with the applicator inverted or upside down).

The apparatus may comprise means for moving the applicator along the surface of the workpiece, thereby forming a film of sealant. The apparatus may comprise means for moving the applicator into, and out of, contact with a surface of a workpiece onto which the film is to be formed. The workpiece may optionally comprise a vehicle component, such as an aircraft component. The apparatus of the third aspect of the present invention is optionally suitable for sealing a gap between two different workpieces.

According to a fourth aspect of the present invention, there is also provided a method of forming a film of sealant on a surface of a workpiece, the method comprising:

contacting sealant with a surface of a workpiece; and moving an applicator in accordance with the first aspect or the second aspect of the present invention over the sealant, thereby forming a film of sealant.

Movement of the applicator may be mechanical (i.e. non-manual) movement. Movement of the applicator may be automated.

Contacting sealant with a surface of a workpiece optionally comprises depositing sealant onto a surface of a workpiece.

The workpiece may comprise a vehicle component, such as an aircraft component.

Contacting sealant with a surface of the workpiece may be automated.

The surface of the workpiece may be downward-facing. The applicator may be in an inverted (upside down) orientation.

The method may comprise contacting the applicator with the surface of the workpiece before contacting sealant with the surface of the workpiece.

The method of the fourth aspect of the present invention may be performed using the apparatus of the third aspect of the present invention. The method of the fourth aspect of the present invention may be used to seal a gap between two different workpieces.

It will, of course, be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
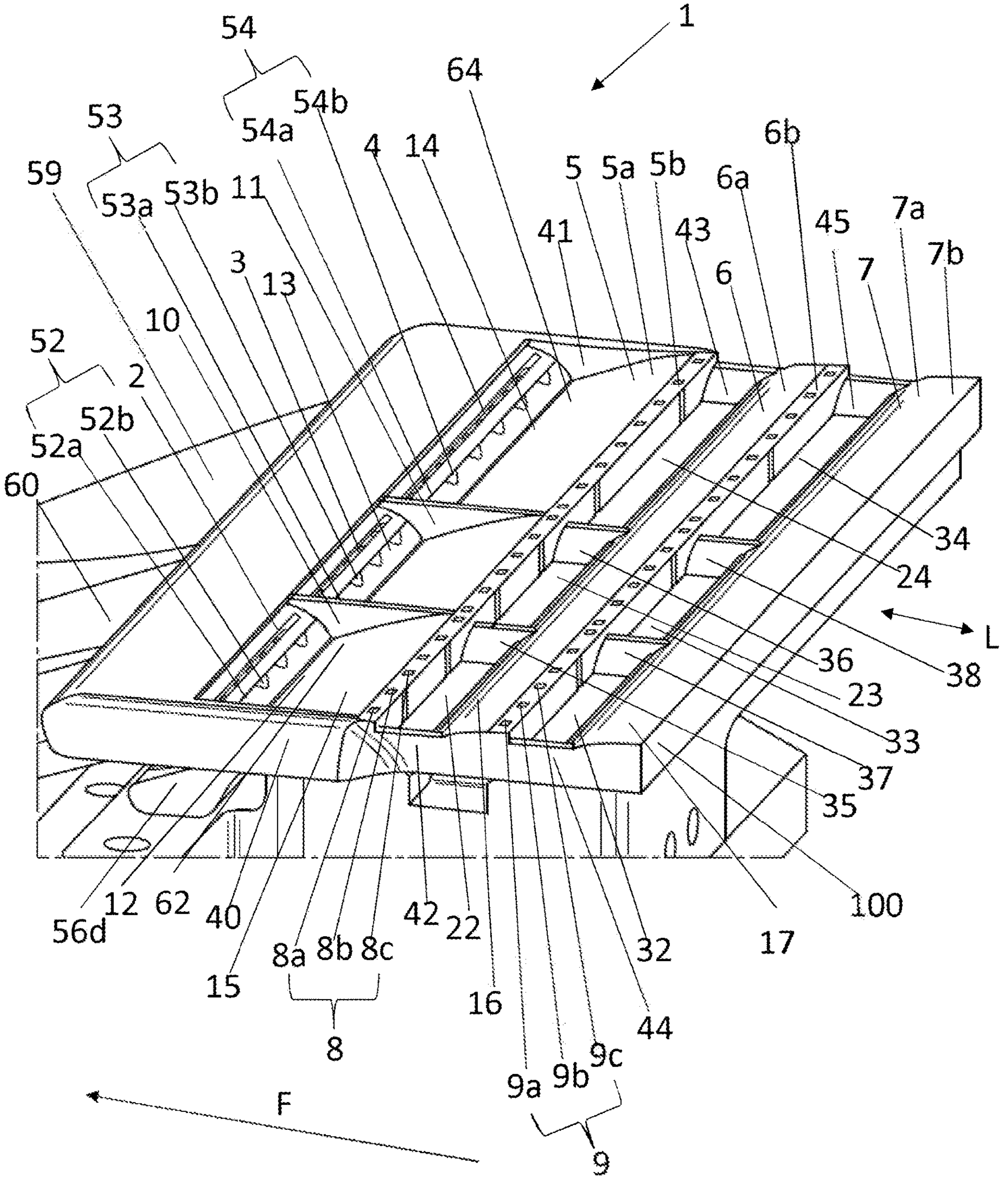
FIG. 1 shows a perspective view of the underside of an example of an embodiment of an applicator in accordance with the first and second aspects of the present invention.
Figure 2:
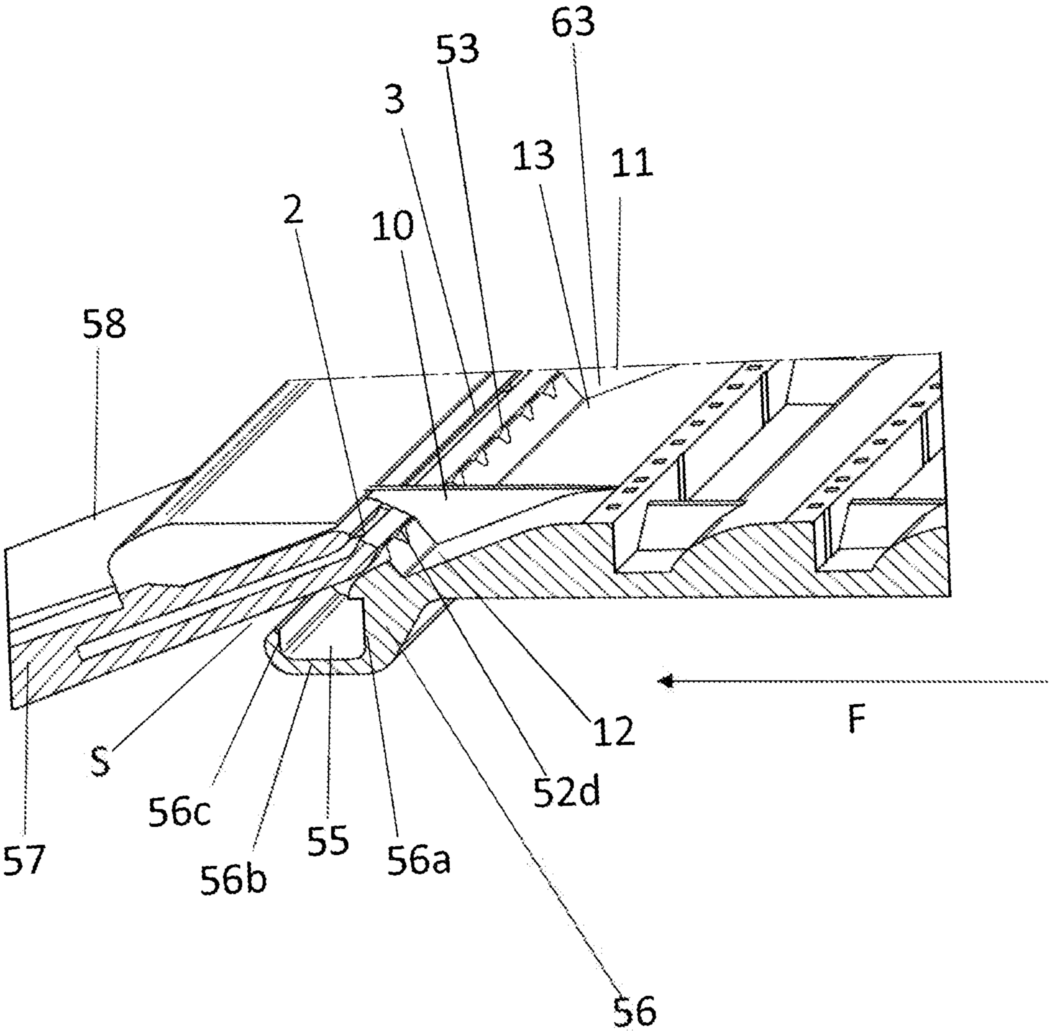
FIG. 2 shows a cross-sectional perspective view of part of the applicator of FIG. 1.

FIGS. 1 and 2 shows perspective views of the underside of applicator 1 in accordance with the first and second aspects of the present invention. FIG. 2 is a cross-sectional perspective view. The applicator 1 comprises three inlets 2, 3, 4 for depositing sealant on to a surface. The applicator comprises an applicator main body 100, which comprises three sealant-contacting surfaces 5, 6, 7 for contacting sealant deposited onto the surface through the inlet as the applicator is moved across said surface. Essentially, sealant is deposited through inlets 2, 3, 4 into a respective inlet reservoir 12, 13, 14 and onto a surface on which a film of sealant is to be formed. Spacers, in the form of projections (some of which are labelled 8*a, b, c*, 9*a, b, c*) contact the surface onto which the sealant is deposited and maintain the sealant-contacting surfaces 5, 6, 7 at a predetermined spacing from the surface. The applicator 1 is moved in a forwards motion, shown generally by reference numeral F. This movement causes the sealant-contacting surfaces 5, 6, 7 to move over the sealant deposited through inlets 2, 3, 4, thereby forming a film of sealant, the thickness of the film of sealant being determined by, amongst other things, the spacing between the sealant-contacting surfaces 5, 6, 7 and the surface on which the film of sealant is formed. The applicator 1 comprises three inlet reservoirs 12, 13, 14, each of which receives sealant from a respective inlet 2, 3, 4. Each inlet reservoir 12, 13, 14 is configured to provide a covered space when the applicator is in contact with a surface onto which sealant is to be deposited. The covered space allows the applicator to be used in an inverted orientation, inhibiting loss of sealant from that space. Each inlet reservoir 12, 13, 14 comprises an open face 62, 63, 64 that is, in use, placed proximate the surface onto which sealant is to be deposited.

The volume of each inlet reservoir 12, 13, 14 facilitates the storage of a reasonable volume of sealant in the reservoir. This ensures that there is sufficient sealant in a reservoir to help facilitate the deposition of a uniform film, particularly if the applicator 1 is used in an inverted orientation.

Each inlet reservoir 12, 13, 14 is provided with a respective set 52, 53, 54 of overflow outlets, some of which are labelled 52*a, b, d*, 53*a, b*, 54*a, b*. Each overflow outlet is substantially triangular in cross-section, and is in communication with an outlet flow channel (not shown) that leads from the overflow outlet to a position above an overflow reservoir 55 (best seen in FIG. 2). If excess sealant is delivered to an inlet reservoir at too high a pressure, then sealant passes through the respective overflow outlets, through the respective outlet flow channels into the overflow reservoir. The overflow reservoir 55 retains the excess sealant and prevents it from dropping from the applicator when the applicator is used in an inverted orientation, as shown in FIGS. 1 and 2. Each overflow outlet 52*a, b, d*, 53*a, b*, 54*a, b* inhibits unwanted leakage of sealant from the respective inlet reservoir 12, 13, 14, while permitting passage of sealant in the event that the pressure in the inlet reservoir exceeds a certain level. The overflow outlets provide a narrowing in the flow path between an inlet reservoir and the overflow reservoir, inhibiting unwanted leakage from the applicator, while permitting egress of sealant in the event that the pressure in the inlet reservoir becomes too high.

The overflow reservoir 55 is provided by a trough 56, which is formed by first 56*a*, second 56*b*, and third 56*c* trough walls. The overflow reservoir 55 and hence trough 56 are located towards the front of the applicator and are located forwards of the three inlet reservoirs 12, 13, 14. Trough 56 extends across the width of applicator 1, normal to the direction of intended movement F of the applicator 1 and normal to a longitudinal axis L of applicator 1. First trough wall 56*a* extends away from the main body 100 of the applicator 1. Second trough wall 56*b* extends from an end of the first trough wall 56*a* remote from the main body 100. Third trough wall 56*c* extends from an end of the second trough wall 56*b* remote from its attachment to the first trough wall 56*a*. Third trough wall 56*c* is relatively short, effectively forming a lip to help retain excess sealant in the trough 56. Referring to FIG. 2, the relatively small height of third trough wall 56*c* provides a space S that facilitates insertion of nozzles 57, 58, 59 into main body 100 of the applicator. Referring to FIG. 1, a trough end wall 56*d* is provided on each end of the trough 56 to help retain excess sealant when the applicator is used in an inverted orientation.

Applicator 1 comprises three nozzles 57, 58, 59 in a unitary nozzle attachment 60. Nozzle attachment 60 is located in a slot provided in applicator main body 100. Each nozzle 57, 58, 59 provides a respective inlet 2, 3, 4 to provide sealant to the applicator 1. Each inlet 2, 3, 4 is slot-shaped and is elongate, and extends across the width of a respective inlet reservoir 12, 13, 14. This arrangement facilitates provision of sealant across substantially the entire width of a reservoir, and facilitates the formation of a film of uniform width. Each nozzle 57, 58, 58 is attached to a separate source of sealant (not shown) and is provided with a separate means of urging the sealant to the respective nozzle. This means that sealant may be delivered separately through the different nozzles, and into the different reservoirs. Partitions 10, 11 are provided between adjacent inlet reservoirs 12, 13, 14. This inhibits movement of sealant between inlet reservoirs and facilitates the deposition of films of well-defined and uniform width. Lateral walls 40, 41 inhibit loss of sealant from the inlet reservoirs, and therefore facilitate the deposition of films of well-defined and uniform widths.

The use of multiple inlets and associated inlet reservoirs facilitates the production of films of different width. For example, by supplying sealant through inlets 2, 3 and 4 a film having a width approximately corresponding to the width of the whole applicator may be deposited. Narrower films may be formed by supplying sealant to any one or two of inlets 2, 3, 4. Furthermore, in the present case, inlet 4 and inlet reservoir 14 are each wider than their respective counterpart inlets 2, 3 and inlet reservoirs 12, 13. This facilitates even greater control of the width of the film deposited using the applicator 1 of the present invention.

As mentioned above, applicator 1 comprises three sealant-contact surfaces 5, 6, 7. Each of said sealant-contacting surfaces is provided by a respective baffle 15, 16, 17. Each sealant-contacting surface 5, 6, 7 comprises a curved portion 5*a*, 6*a*, 7*a* that extends to a flat portion 5*b*, 6*b*, 7*b*. The front-most two of those flat portions 5*b*, 6*b* are provided with sets 8, 9 of squat projections (some of which are labelled 8*a, b, c*, 9*a*, 9*b*, 9*c*) for contacting the surface on which the film is to be deposited, and for maintaining the respective sealant-contacting surfaces in spaced relationship with the surface on which the film is to be formed. The squat projections in this case are cuboids, though alternative projection shapes may be used. As the applicator is moved in a forwards direction, a film is formed on the surface of the workpiece. In this case, the workpiece is an aircraft component, but this need not be the case. The squat projections cause furrows to be formed in the film, and this may be undesirable, not least because this may cause a film of uneven thickness. Rearmost sealant-contacting surface 7 is smooth and devoid of squat projections, and passage of this rearmost sealant-contacting surface 7 over the furrows formed by the projections projecting from the sealant-contacting surfaces 5, 6 substantially removes said furrows and produces a film of substantially uniform thickness.

Applicator 1 comprises first 22, second 23 and third 24 sub-spaces between sub-spaces between first 15 and second 16 baffles. The sub-spaces 22, 23, 24 permit the storage of sealant. Furthermore, the width of each of the sub-spaces 22, 23, 24 is essentially the same as that of the corresponding inlet reservoir. The width of first sub-space 22 is essentially the same as that of first inlet reservoir 12, the width of second sub-space 23 is essentially the same as that of second inlet reservoir 13 and the width of third sub-space 24 is essentially the same as that of third inlet reservoir 14. First divider 35 separates first 22 and second 23 sub-spaces. Second divider 36 separates second 23 and third 24 sub-spaces. Applicator 1 also comprises fourth 32, fifth 33 and sixth 34 sub-spaces between sub-spaces between second 16 and third 17 baffles. The sub-spaces 32, 33, 34 permit the storage of sealant. Furthermore, the width of each of the sub-spaces 32, 33, 34 is essentially the same as that of the corresponding inlet reservoir. The width of fourth sub-space 32 is essentially the same as that of first inlet reservoir 12 and first sub-space 22, the width of fifth sub-space 33 is essentially the same as that of second inlet reservoir 13 and second sub-space 23, and the width of sixth sub-space 34 is essentially the same as that of third inlet reservoir 14 and third sub-space 24. Third divider 37 separates fourth 32 and fifth 33 sub-spaces. Fourth divider 38 separates fifth 33 and sixth 34 sub-spaces. The matching of the widths of the sub-spaces with the width of the respective inlet reservoir helps produce sealant films of uniform width.

The applicator 1 is formed from plastics material and is disposable.

Nozzle attachment 60 is detachable from the main body 100 of applicator 1 to facilitate cleaning of the nozzles.

Figure 3:
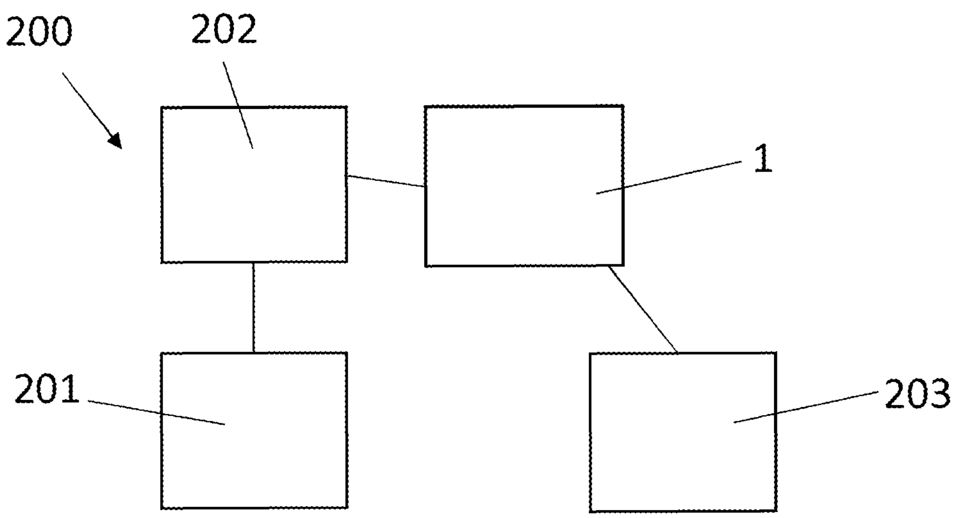
FIG. 3 shows a schematic representation of an example of an embodiment of an apparatus in accordance with the third aspect of the present invention.

An example of an embodiment of an apparatus in accordance with the third aspect of the present invention will now be described by way of example only with reference to FIG. 3. The apparatus is denoted generally by reference numeral 200, and comprises applicator 1 described above in relation to FIGS. 1 and 2, a source of sealant 201 and pumps 202 for moving sealant from the source of sealant to applicator 1. In the present case, there are three pumps (not shown), each one configured to deliver sealant to a respective inlet 2, 3, 4 of applicator 1. Apparatus 200 also comprises means 203 for moving the applicator along the surface of the workpiece, thereby forming a film of sealant. The means 203 for moving the applicator along the surface of the workpiece comprises a motor. The means 203 for moving the applicator along the surface of the workpiece may also move the applicator into, and out of, contact with the surface of the workpiece.

Figure 4:
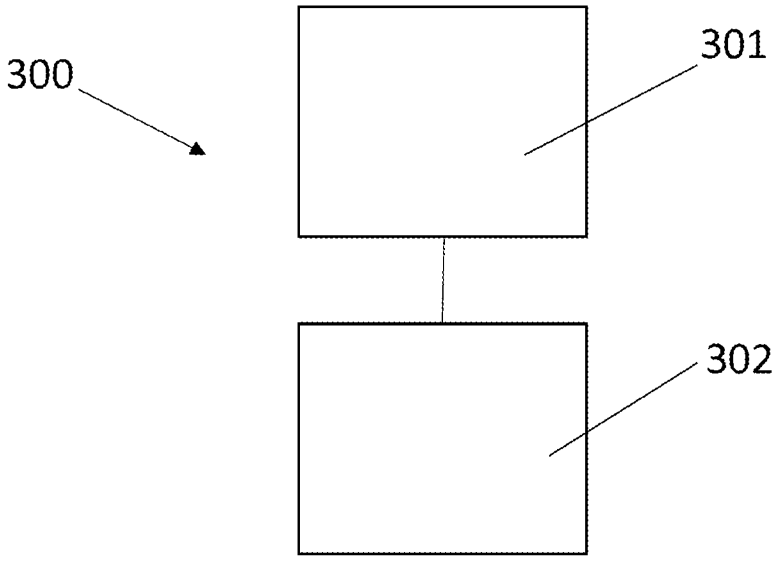
FIG. 4 shows a schematic representation of an example of an embodiment on a method of depositing sealant in accordance with the fourth aspect of the present invention.

An example of an embodiment of a method in accordance with the fourth aspect of the present invention will now be described by way of example only with reference to FIG. 4. A method of depositing a film of sealant on a surface of an workpiece is denoted by reference numeral 300. In the present case, the workpiece is an aircraft component, but this need not be the case. The method 300 comprises depositing 301 sealant onto a surface of a workpiece, and moving 302 applicator 1, thereby forming a film of sealant. Referring to FIGS. 1 and 2, applicator 1 is moved in a forwards direction, denoted by F in FIGS. 1 and 2.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The examples above describe an applicator with three inlet reservoirs which facilitate the deposition of films of sealant of different widths. Those skilled in the art will realise that applicators in accordance with the first and second aspects of the invention do not need multiple inlet reservoirs; indeed, applicators in accordance with the second aspect of the present invention do not need an inlet reservoir at all.

The examples above describe an applicator that is used inverted. Those skilled in the art will realise that this need not be the case.

The examples above describe an applicator with an overflow reservoir that is located forward of the inlet reservoir. This need not be the case, but is convenient for an applicator that is used inverted.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An applicator for the deposition of sealant onto a surface of a workpiece, the applicator comprising:

at least one inlet for depositing sealant on to a surface or a nozzle-receiving space for receiving a nozzle comprising at least one inlet for depositing sealant on to a surface;

at least one sealant-contacting surface for contacting sealant deposited onto the surface through an inlet as the applicator is moved across said surface, thereby forming a film of sealant on said surface;

at least one spacer for contacting a surface onto which sealant is to be deposited and for maintaining the sealant-contacting surface in spaced relationship with the surface;

at least one inlet reservoir for receiving sealant from at least one inlet, the inlet reservoir being configured to provide a covered space when the applicator is in contact with a surface onto which sealant is to be deposited;

at least one overflow outlet for the egress of excess sealant from an inlet reservoir;

wherein the at least one overflow outlet is in fluid communication with an inlet reservoir;

an overflow reservoir for receiving excess sealant from at least one overflow outlet; and, wherein the at least one overflow outlet is positioned above the overflow reservoir when the applicator is in an inverted orientation.

2. The applicator according to claim 1 comprising a plurality of inlet reservoirs, each inlet reservoir being configured to provide a covered space when the applicator is in contact with the surface onto which sealant is to be deposited.

3. The applicator according to claim 1 wherein at least one inlet reservoir has an open face for placement proximate to the surface on to which sealant is to be deposited.

4. The applicator according to claim 2 in which adjacent inlet reservoirs are separated by a partition to inhibit movement of sealant between inlet reservoirs.

5. The applicator according to claim 2 in which the inlet reservoirs are laterally spaced.

6. The applicator according to claim 1 in which at least one overflow outlet provides a flow constrictor in a fluid flow path out of an inlet reservoir.

7. The applicator according to claim 1 in which at least one inlet reservoir is in fluid communication with a plurality of overflow outlets.

8. The applicator according to claim 1 in which at least one overflow outlet is located forward of the respective inlet reservoir in a forward direction of the applicator movement.

9. The applicator according to claim 1, comprising an overflow reservoir for receiving excess sealant from at least one overflow outlet, wherein the overflow reservoir is located forward of at least one inlet reservoir in a forward direction of the applicator movement.

10. The applicator according to claim 9 in which the overflow reservoir comprises a trough for the receipt, and retention of, excess sealant, wherein the trough is elongate and runs parallel to the width of the applicator.

11. The applicator according to claim 10 in which the trough comprises a first wall portion, a second wall portion that projects from the first wall portion, and a third wall portion that projects from the second wall portion, from an end of the second wall portion remote from the end of the second wall portion that projects from the first wall portion, and at least one lateral trough wall that inhibits loss of excess sealant.

12. The applicator according to claim 1 in which more than one sealant-contacting surface is provided with at least one spacer for contacting a surface onto which sealant is to be deposited and for maintaining the sealant-contacting surface in spaced relationship with the surface on which sealant is to be deposited, and at least one sealant-contacting surface is substantially devoid of such spacers.

13. The applicator according to claim 1 in which at least one spacer is in the form of a projection.

14. The applicator according to claim 13 in which at least one projection is hemispherical, a segment of a sphere, conical, frusto-conical, cylindrical or cuboid.

15. An applicator for the deposition of sealant onto a surface of a workpiece, the applicator comprising:

at least one inlet for depositing sealant on to a surface or a nozzle-receiving space for receiving a nozzle comprising at least one inlet for depositing sealant on to a surface;

at least one sealant-contacting surface for contacting sealant deposited onto the surface through the inlet as the applicator is moved across said surface, thereby producing a film of sealant on said surface;

a plurality of projections that project from a respective sealant-contacting surface for maintaining the sealant-contacting surface in spaced relationship with the surface;

at least one overflow outlet for the egress of excess sealant from an inlet reservoir, and wherein the at least one overflow outlet is in fluid communication with the inlet reservoir;

and an overflow reservoir for receiving excess sealant from at least one overflow outlet, wherein the overflow reservoir is in front of the inlet reservoir.

16. The applicator according to claim 15, in which at least one projection is hemispherical, a segment of a sphere, conical, frusto-conical, cylindrical or cuboid.

17. The applicator according to claim 15, in which at least one sealant-contacting surface comprise a flat portion, and at least one flat portion is provided with a plurality of projections, wherein at least one sealant-contacting surface is substantially devoid of projections.

18. An apparatus for forming a film of sealant on a surface of a workpiece, the apparatus comprising an applicator according to claim 1 and a source of sealant configured to deliver sealant to the applicator.

19. A method of forming a film of sealant on a surface of a workpiece, the method comprising:

contacting sealant with a surface of a workpiece; and moving an applicator in accordance with claim 1 over the sealant, thereby forming a film of sealant.

* * * * *